US012771975B2

(12) United States Patent
Akiyama

(10) Patent No.: US 12,771,975 B2
(45) Date of Patent: Oct. 20, 2026

(54) DIAPHRAGM WITH EXCITER, AND VEHICLE WINDOW GLASS

(71) Applicant: AGC Inc., Tokyo (JP)

(72) Inventor: Jun Akiyama, Tokyo (JP)

(73) Assignee: AGC INC., Tokyo (JP)

( * ) Notice: Subject to any disclaimer, the term of this patent is extended or adjusted under 35 U.S.C. 154(b) by 190 days.

(21) Appl. No.: 18/671,055

(22) Filed: May 22, 2024

(65) Prior Publication Data

US 2024/0314478 A1 Sep. 19, 2024

Related U.S. Application Data

(63) Continuation of application No. PCT/JP2022/042917, filed on Nov. 18, 2022.

(30) Foreign Application Priority Data

Nov. 24, 2021 (JP) ................................ 2021-190406

(51) Int. Cl.
*H04R 1/02* (2006.01)
*H04R 1/28* (2006.01)

(52) U.S. Cl.
CPC ............. *H04R 1/025* (2013.01); *H04R 1/028* (2013.01); *H04R 1/2873* (2013.01); *H04R 2307/023* (2013.01); *H04R 2499/13* (2013.01)

(58) Field of Classification Search
CPC ...... H04R 1/025; H04R 1/028; H04R 1/2873; H04R 2307/023; H04R 2499/13; H04R 2440/05; H04R 7/045
See application file for complete search history.

(56) References Cited

U.S. PATENT DOCUMENTS

| | | | |
|---|---|---|---|
| 8,792,657 B2 | 7/2014 | Suzuki et al. |
| 11,290,807 B2 | 3/2022 | Akiyama et al. |
| 2017/0295432 A1 | 10/2017 | Kuksenkov et al. |
| 2019/0028787 A1 | 1/2019 | Masuda et al. |
| 2020/0404412 A1 | 12/2020 | Akiyama et al. |
| 2021/0314706 A1 | 10/2021 | Akiyama et al. |
| 2022/0217470 A1 | 7/2022 | Akiyama et al. |

(Continued)

FOREIGN PATENT DOCUMENTS

| | | |
|---|---|---|
| JP | 2006-115167 A | 4/2006 |
| JP | 2017-530631 A | 10/2017 |

(Continued)

OTHER PUBLICATIONS

International Searching Authority, "International Search Report," issued in connection with International Patent Application No. PCT/JP2022/042917, dated Jan. 31, 2023.

(Continued)

*Primary Examiner* — Tuan D Nguyen
(74) *Attorney, Agent, or Firm* — Foley & Lardner LLP

(57) ABSTRACT

An exciter-attached diaphragm, including: a glass plate; an exciter attached on a main surface side of the glass plate and configured to vibrate the glass plate; and a vibration damping member located on a periphery of the exciter, surrounding at least a part of the exciter, and attached on the main surface side in a plan view of the glass plate, in which the vibration damping member includes a vibration attenuation layer and a vibration damping material laminated from the main surface side of the glass plate, and the exciter is disposed apart from the vibration damping member.

20 Claims, 9 Drawing Sheets

(56) References Cited

U.S. PATENT DOCUMENTS

| | | | |
|---|---|---|---|
| 2023/0191754 | A1 | 6/2023 | Boure |
| 2023/0217143 | A1 | 7/2023 | Boure et al. |

FOREIGN PATENT DOCUMENTS

| | | | |
|---|---|---|---|
| WO | WO-2018/123310 | A1 | 7/2018 |
| WO | WO-2019/172076 | A1 | 9/2019 |
| WO | WO-2021/060214 | A1 | 4/2021 |
| WO | WO-2021/229179 | A1 | 11/2021 |
| WO | WO-2021/229180 | A1 | 11/2021 |

OTHER PUBLICATIONS

International Searching Authority, "Written Opinion," issued in connection with International Patent Application No. PCT/JP2022/042917, dated Jan. 31, 2023.

DIAPHRAGM WITH EXCITER, AND VEHICLE WINDOW GLASS

CROSS-REFERENCE TO RELATED APPLICATIONS

This is a bypass continuation of International Patent Application No. PCT/JP2022/042917, filed on Nov. 18, 2022, which claims priority to Japanese Patent Application No. 2021-190406, filed on Nov. 24, 2021. The contents of these applications are hereby incorporated by reference in their entireties.

TECHNICAL FIELD

The present invention relates to an exciter-attached diaphragm and a vehicular window glass. Specifically, the present invention relates to an exciter-attached diaphragm and a vehicular window glass that are excellent in sound pressure control.

BACKGROUND ART

In recent years, a technique has been studied in which various plate-shaped members, for example, an electronic device member, a vehicular window member, and an interior member of a transport machine such as a vehicle are vibrated by an exciter (vibrator) to function as a speaker device.

Patent Literature 1 discloses a speaker device including a diaphragm, an exciter, and a vibration transmission portion, in which a loss factor of the diaphragm and a specific modulus of the vibration transmission portion are in a certain range. More specifically, a configuration is disclosed in which the exciter is attached to the diaphragm via the vibration transmission portion, and a rod holding member is adhered and fixed to a glass substrate surface. Accordingly, an excellent designability can be exhibited without impairing designability of the diaphragm while maintaining an acoustic performance.

CITATION LIST

Patent Literature

Patent Literature 1: WO2019/172076

SUMMARY OF INVENTION

However, when a vibration caused by an exciter is transmitted to a diaphragm such as a glass, the vibration of the exciter may cause a phenomenon called a divided vibration in which the diaphragm vibrates in a wave manner independently of the exciter in a high-frequency region. When an exciter-attached diaphragm generates such a divided vibration, there is a problem that a sound quality particularly in a high-frequency sound range is deteriorated.

The present disclosure provides an exciter-attached diaphragm and a vehicular window glass, which are capable of preventing deterioration of a sound quality due to a fluctuation in a sound pressure particularly in a high-frequency region when a glass plate with an exciter attached thereto is used as a glass diaphragm.

In one aspect of the present disclosure, it is possible to provide an exciter-attached diaphragm, including:

a glass plate;

an exciter attached on a main surface side of the glass plate and configured to vibrate the glass plate; and a vibration damping member located on a periphery of the exciter, surrounding at least a part of the exciter, and attached on the main surface side in a plan view of the glass plate, in which the vibration damping member includes a vibration attenuation layer and a vibration damping material laminated from the main surface side of the glass plate, and the exciter is disposed apart from the vibration damping member.

In another aspect of the present disclosure, it is possible to provide a vehicular window glass including the above exciter-attached diaphragm as a window member.

According to the technique of the present disclosure, it is possible to provide an exciter-attached diaphragm and a vehicular window glass, which include an exciter and are capable of preventing deterioration of a sound quality due to a change in a sound pressure in a predetermined frequency sound range, particularly in a high-frequency region.

DESCRIPTION OF EMBODIMENTS

Figure 1:
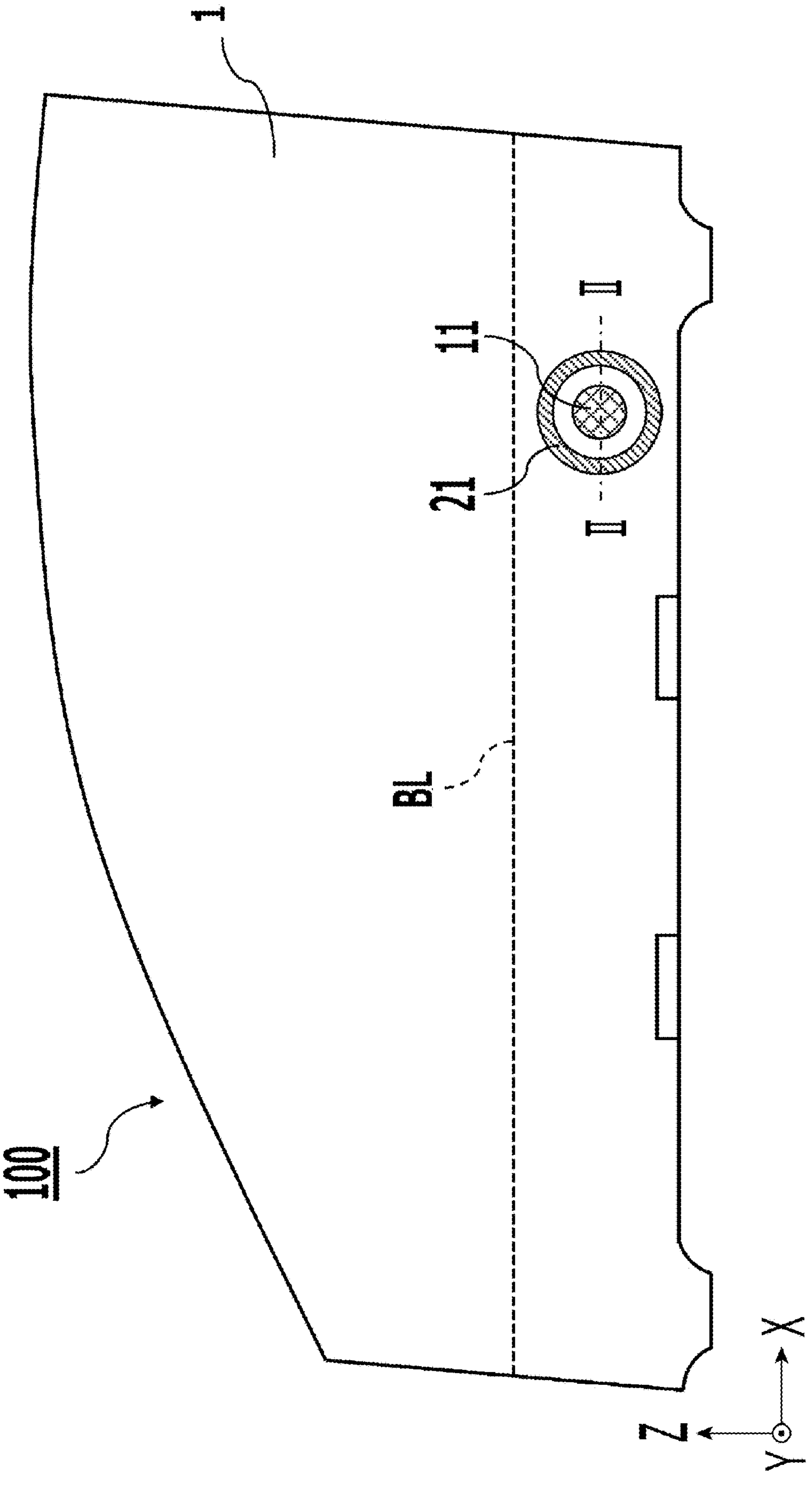
FIG. 1 is a plan view showing an example of an exciter-attached diaphragm according to a first embodiment.

Hereinafter, embodiments of the present invention will be described in detail. In the following drawings, members and portions having the same functions may be denoted by the same reference numerals, and duplicate descriptions may be omitted or simplified. The embodiments described in the drawings are schematically for the purpose of clearly illustrating the present invention, and do not necessarily accurately represent a size or a scale of an actual product.

First Embodiment

FIG. 1 is a plan view showing an exciter-attached diaphragm 100 according to a first embodiment. The exciter-attached diaphragm 100 includes a glass plate 1, an exciter 11 attached to a main surface of the glass plate 1, and a vibration damping member 21 disposed on a periphery of the exciter 11 in a plan view (XZ plane in FIG. 1) of the glass plate 1. The exciter-attached diaphragm 100 according to the present embodiment is an example of a window member, and generates desired acoustics by vibrating the glass plate 1 by driving (vibrating) the exciter 11. The glass plate 1 shown in FIG. 1 is an example of a vehicular window glass, and is a side glass (side window).

When the exciter 11 is attached on a main surface of a vehicular side glass as the glass plate 1, the exciter 11 is preferably disposed in a region below a belt line BL (in a negative Z-axis direction). In particular, in the side glass (glass plate 1) including a lifting mechanism (not shown), it is preferable to dispose the exciter 11 in a region below the belt line BL because the exciter 11 is hidden by a door panel or the like and does not impair visibility of an opening region of the glass plate 1.

The glass plate may be a single plate glass made of one glass plate, or may be a laminated glass obtained by sandwiching a pair of glass plates with a resin or the like. However, since the exciter-attached diaphragm 100 according to the present embodiment can be particularly expected to improve an acoustic effect, the glass plate 1 will be described as a single plate glass unless otherwise specified. The glass plate 1 is not limited to the side glass, and can be applied to various window glasses (window members) mounted on a vehicle, such as a rear glass, a windshield, a roof glass, a rear quarter glass, and a front bench glass.

In the exciter-attached diaphragm 100 according to the first embodiment shown in FIG. 1, the exciter 11 is attached to the main surface of the glass plate 1 in the region below the belt line BL, and the vibration damping member 21 is disposed so as to surround the periphery of the exciter 11 in the plan view of the glass plate 1. A position of the exciter 11 attached on the main surface of the glass plate 1 is not particularly limited, and when the glass plate 1 is the side glass including the lifting mechanism, the exciter 11 is attached to any position as long as the exciter 11 is in the region below the belt line BL. Similarly, when the glass plate 1 is the side glass including the lifting mechanism, the vibration damping member 21 is also attached to a position surrounding the periphery of the exciter 11 in the region below the belt line BL.

Further, in the exciter-attached diaphragm 100, the number of exciters 11 attached to the glass plate 1 is not limited to one, and may be plural. For example, when a plurality of exciters 11 are attached to the glass plate 1, a plurality of vibration damping members 21 corresponding to the respective exciters 11 may be provided according to the number of the exciters 11, or the number of the vibration damping members 21 may be smaller than the number of the exciters 11 by providing the vibration damping members 21 surrounding a plurality of the exciters 11 close to each other. Hereinafter, unless otherwise specified, the exciter-attached diaphragm 100 according to the present embodiment will be described on the assumption that the glass plate 1 includes one exciter 11 and one vibration damping member 21.

When the glass plate 1 is a vehicular window glass which is a fixed window without a lifting mechanism (opening and closing mechanism), the exciter 11 and the vibration damping member 21 may be attached to any position. However, even when the glass plate 1 is a fixed window such as a vehicular rear glass, the exciter 11 and the vibration damping member 21 are preferably attached to a periphery of the glass plate 1 such that a transmission region of the glass plate 1 does not become small and an appearance to an occupant is not deteriorated.

For example, when the glass plate 1 is the vehicular window glass and a light shielding film (not shown) having a predetermined width is formed on an inner side of an edge, it is preferable that at least a part of the exciter 11 and the vibration damping member 21 overlap the light shielding film, which makes it difficult for an occupant to see the exciter 11 and the vibration damping member 21, and it is more preferable that all of the exciter 11 and the vibration damping member 21 overlap the light shielding film. The light shielding film is a non-transparent colored ceramic layer having a thickness of about 5 μm to 25 μm, and a color thereof may be any color, but a dark color such as black, brown, gray, and dark blue, or white is preferred, and black is more preferred.

In the exciter-attached diaphragm 100 according to the first embodiment, the exciter 11 and the vibration damping member 21 are not in direct contact with each other. That is, the vibration damping member 21 is disposed with a predetermined gap (space) with the exciter. As described above, the vibration damping member 21 is spaced apart from the exciter 11 and is disposed so as to surround the exciter 11, and thus a vibration generated from the exciter 11 can be transmitted to the glass plate 1, a divided vibration generated in the glass plate 1 can be prevented, and acoustic reproducibility is improved.

In the exciter-attached diaphragm 100 according to the present embodiment shown in FIG. 1, in the plan view of the glass plate 1, the exciter 11 has a circular outer edge, and the vibration damping member 21 surrounds the exciter 11 by forming an annular closed loop at a constant distance. Therefore, in this example, a center of gravity of the exciter 11 coincides with a center of gravity of the vibration damping member 21, and the outer edge of the exciter 11 and an inner edge and an outer edge of the vibration damping member 21 have a concentric relationship.

In the plan view of the glass plate 1, the shape of the inner edge and the outer edge of the vibration damping member 21 are not limited to a circular shape, and may be any shape such as an elliptical shape or a polygonal shape. A width of the vibration damping member 21 may be substantially constant as shown in FIG. 1, and may be partially different (in an annular ring). When the width of the vibration damping member 21 is substantially constant, deviation of a vibration damping level of the glass plate 1 on the periphery of the exciter can be easily made uniform. Further, a cross-sectional shape of the vibration damping member 21 substantially orthogonal to an extending direction (along an XY plane) is not limited to a rectangular shape, and may be a trapezoidal shape, and may be set to any shape.

Next, components of an exciter-attached diaphragm 101 will be described in detail with reference to FIGS. 2A and 2B. FIG. 2B is a cross-sectional view (on an XY plane) of the exciter-attached diaphragm 101 shown in FIG. 2A, taken along a dashed line II-II passing through a center of gravity of the exciter 11.

In the exciter-attached diaphragm 101 according to the present embodiment, as described above, the exciter 11 and the vibration damping member 21 are disposed with a distance D therebetween without direct contact. The distance D may be 0.2 mm or more, preferably 0.5 mm or more, more preferably 1.0 mm or more, and still more preferably 5.0 mm or more. When the distance D is less than 0.2 mm, at least one of the exciter 11 and the vibration damping member 21 may be displaced depending on a use situation, and the exciter 11 and the vibration damping member 21 may come into contact with each other. An upper limit of the distance D is not particularly limited, and may be 50 mm or less, preferably 40 mm or less, more preferably 30 mm or less, and still more preferably 20 mm or less. When the distance D is more than 50 mm, a region occupied by the vibration damping member 21 and the exciter 11 expands on a main surface of the glass plate 1, which may cause a problem that a transmission region becomes small. When the distance D is more than 50 mm, a weight of the vibration damping member 21 may increase more than necessary.

The vibration damping member 21 is disposed on the same main surface as the main surface of the glass plate 1 provided with the exciter 11, surrounding at least a part of the exciter 11, and spaced apart from the exciter 11 by the distance D. The vibration damping member 21 includes a vibration attenuation layer 31 and a vibration damping material 32 laminated in this order from the main surface of the glass plate 1.

<Glass Plate>

A composition of the glass plate 1 constituting the exciter-attached diaphragm 101 is not particularly limited, and a soda lime glass, an aluminosilicate glass, a borosilicate glass, a lead glass, an alkali barium glass, an aluminoborosilicate glass, or the like can be used. When the glass plate 1 is used as a vehicular window glass, a tempered glass is preferred because a predetermined strength can be obtained. Examples of the tempered glass include an air-cooled tempered glass and a chemically tempered glass, and a chemically tempered glass is preferred as a tempered glass having a small plate thickness. When the glass plate 1 is a chemically tempered glass, the glass plate 1 may have a composition capable of being tempered by forming and a chemical tempering treatment.

A plate thickness of the glass plate 1 is not particularly limited, and when the vehicular window glass is a single plate glass, the plate thickness may be 0.5 mm or more, preferably 0.7 mm or more, more preferably 1.0 mm or more, and still more preferably 1.5 mm or more from the viewpoint of a glass strength. When the glass plate 1 is the single plate glass, the plate thickness may be 5.0 mm or less, preferably 4.0 mm or less, and more preferably 3.0 mm or less from the viewpoint of weight reduction.

The glass plate 1 may be a bent glass having a curved shape and a predetermined curvature, or may have a planar shape (non-curved shape). When the glass plate 1 is the vehicular window glass, the glass plate 1 may have a single curved shape curved in either a vertical direction or a horizontal direction (with respect to one side of a frame) when the glass plate 1 is attached to a vehicle, or may have a multi-curved shape curved in both the vertical direction and the horizontal direction. The single curved shape may be a shape curved only in any one direction, and the multi-curved shape may be a shape curved in any two or more different directions. When the glass plate 1 is a bent glass having a curved shape, a minimum value of a radius of curvature is preferably 500 mm or more and 100,000 mm or less.

At least a part of the glass plate 1 may be colored. This is useful for a specification having a functional property such as IR cut, UV cut, and a privacy glass when the glass plate 1 has designability.

<Exciter>

Although not shown, the exciter 11 includes a coil portion electrically connected to an external device, a magnetic circuit portion, and a vibrating portion connected to the coil portion or the magnetic circuit portion. When an electric signal of a sound (sound pressure) from the external device is input to the coil portion, the coil portion or the magnetic circuit portion vibrates due to interaction between the coil portion and the magnetic circuit portion. The vibration of the coil portion or the magnetic circuit portion is transmitted to the vibrating portion, and the vibration is transmitted from the vibrating portion to the glass plate 1. The exciter 11 can be of various specifications, and it is particularly preferable that a portion protruding from the main surface of the glass plate 1 be small and a height thereof be low so that the height can be reduced from the viewpoint of space saving. The exciter 11 varies depending on a type of the glass plate 1 to be attached and a specification of a frequency range of vibration, and a height thereof can be selected as appropriate, and examples thereof include heights of 20 mm or less, 15 mm or less, and 12 mm or less.

<Adhesive Layer>

The exciter 11 is fixed to the glass plate 1 via an adhesive layer 12. For the adhesive layer 12, various adhesives can be used, such as a thermosetting adhesive, a photocuring adhesive, a moisture curing adhesive, and a two-liquid mixed adhesive. In a case of a thermosetting adhesive, by adjusting types and ratios of materials to be added to the adhesive, a crosslinking density can be increased, and heat resistance after curing, chemical resistance, and moisture resistance can be improved. In a case of a photocuring adhesive, the adhesive can be adhered instantly by irradiation with ultraviolet rays, and thus an adhering work time can be shortened. A material of the adhesive layer 12 is preferably, for example, a material of a group in which a film material is adhered by thermoplastic, and may be a polyvinyl butyral resin (PVB), an ethylene-vinyl acetate copolymer resin (EVA), urethane, or the like.

In addition, the adhesive layer 12 is preferably made of a material having a low hardness (rubber region) in an operating temperature range (−40° C. to 90° C.) from the viewpoint of preventing glass cracking due to a linear expansion difference during bonding to the glass plate 1. Therefore, a Young's modulus of the adhesive layer 12 is preferably 0.01 MPa or more and 100 MPa or less.

A thickness of the adhesive layer 12 is preferably 1.0 μm or more, more preferably 20 μm or more, and still more preferably 50 μm or more. In addition, the thickness of the adhesive layer 12 is preferably 3.0 mm or less, more preferably 2.0 mm or less, and still more preferably 1.5 mm or less. When the adhesive layer 12 is in the above range, a necessary and sufficient bonding strength can be obtained while maintaining parallelism with the main surface of the glass plate 1 after bonding.

<Vibration Attenuation Layer>

The vibration attenuation layer 31 is a layer that connects the glass plate 1 and the vibration damping material 32.

When the vibration attenuation layer 31 is made of a material having cushioning properties, the vibration attenuation layer 31 can prevent a divided vibration of the glass plate 1 with respect to the vibration generated from the exciter 11. The vibration attenuation layer 31 may be made of a material having a loss factor η measured at 25° C. of $1.0\times10^{-2}$ or more. The loss factor η is obtained using a test method according to JIS K 7391:2008. In the vibration attenuation layer 31, the loss factor η measured at 25° C. is preferably $2.0\times10^{-2}$ or more, and more preferably $5.0\times10^{-2}$ or more. Further, there is no particular upper limit for the loss factor η measured at 25° C., and for example, a material having a loss factor η of $2.0\times10^{0}$ or less can be used. It is sufficient that the vibration attenuation layer 31 satisfies the loss factor η in the above conditions, and specifically, a rubber material or a resin material may be used.

Further, the vibration attenuation layer 31 may have adhesiveness in order to fix the vibration damping material 32 to the glass plate 1, and a pressure-sensitive adhesive such as a double-sided tape is preferably used. Examples of the pressure-sensitive adhesive include an acrylic pressure-sensitive adhesive, a silicone pressure-sensitive adhesive, a urethane pressure-sensitive adhesive, and a rubber pressure-sensitive adhesive. In the double-sided tape, an adhesive layer on one surface of a base material layer made of a resin or the like and an adhesive layer on the other surface may be provided with the same pressure-sensitive adhesive or different pressure-sensitive adhesives. The vibration attenuation layer 31 is not limited to a configuration including the pressure-sensitive adhesive described above. For example, the vibration attenuation layer 31 may have a configuration in which a liquid layer is included and a periphery of the liquid layer is sealed with a resin or the like as long as the loss factor η measured at 25° C. under the above conditions is satisfied.

A thickness of the vibration attenuation layer 31 can be selected as appropriate in a range of 0.05 mm to 5.0 mm. When the thickness of the vibration attenuation layer 31 is less than 0.05 mm, desired vibration attenuation performance may not be satisfied. When the thickness of the vibration attenuation layer 31 is more than 5.0 mm, it is necessary to reduce a thickness of the vibration damping material 32 laminated on the vibration attenuation layer 31, and it is difficult to reduce a height of the vibration damping member 21. The thickness of the vibration attenuation layer 31 is preferably 0.1 mm or more, and more preferably 0.3 mm or more. In addition, the thickness of the vibration attenuation layer 31 is preferably 4.0 mm or less, and more preferably 3.0 mm or less.

<Vibration Damping Material>

The vibration damping material 32 is laminated on a surface of the vibration attenuation layer 31 opposite to the glass plate 1. The vibration damping material 32 may be a single layer or a laminate in which a plurality of layers are laminated. In order to prevent the divided vibration of the glass plate 1 due to the vibration generated from the exciter 11, the vibration damping material 32 may be made of a material having a specific gravity (based on water) of 1.0 or more. A specific gravity of the vibration damping material 32 is preferably 1.1 or more, more preferably 1.5 or more, and still more preferably 2.0 or more. By using a material having a large specific gravity for the vibration damping material 32, even if the thickness of the vibration damping material 32 and a thickness of the vibration damping member 21 are reduced (reduced in height), it is possible to satisfy a weight for achieving the desired effect of the vibration damping member 21, and thus it is easy to save space. An upper limit of the specific gravity of the vibration damping material 32 is not particularly limited, and may be, for example, 20 or less, 15 or less, or 12 or less.

The thickness of the vibration damping material 32 is not particularly limited as the thickness changes depending on a specific gravity of a material to be used, and may be 20 mm or less, preferably 15 mm or less, and more preferably 12 mm or less. In particular, when the thickness (height) of the vibration damping member 21 is same as or less than a total thickness (height) of the adhesive layer 12 and the exciter 11, a height of a portion protruding in a thickness direction of the glass plate 1 can be reduced, which is preferred. When the total height of the adhesive layer 12 and the exciter 11 is 100%, the height of the vibration damping member 21 may be 100% or less, preferably 95% or less, more preferably 90% or less, and still more preferably 80% or less.

A material of the vibration damping material 32 is not particularly limited as long as the specific gravity is 1.0 or more as described above, and a resin, a metal, a glass, a ceramic, or the like can be used. Among these, from the viewpoint of ease of handling such as strength, rigidity, and processability, a resin is preferably used, and an ABS resin (specific gravity: 1.0 to 1.1) is particularly preferably used, but the vibration damping material 32 is not limited thereto.

Figure 2A:
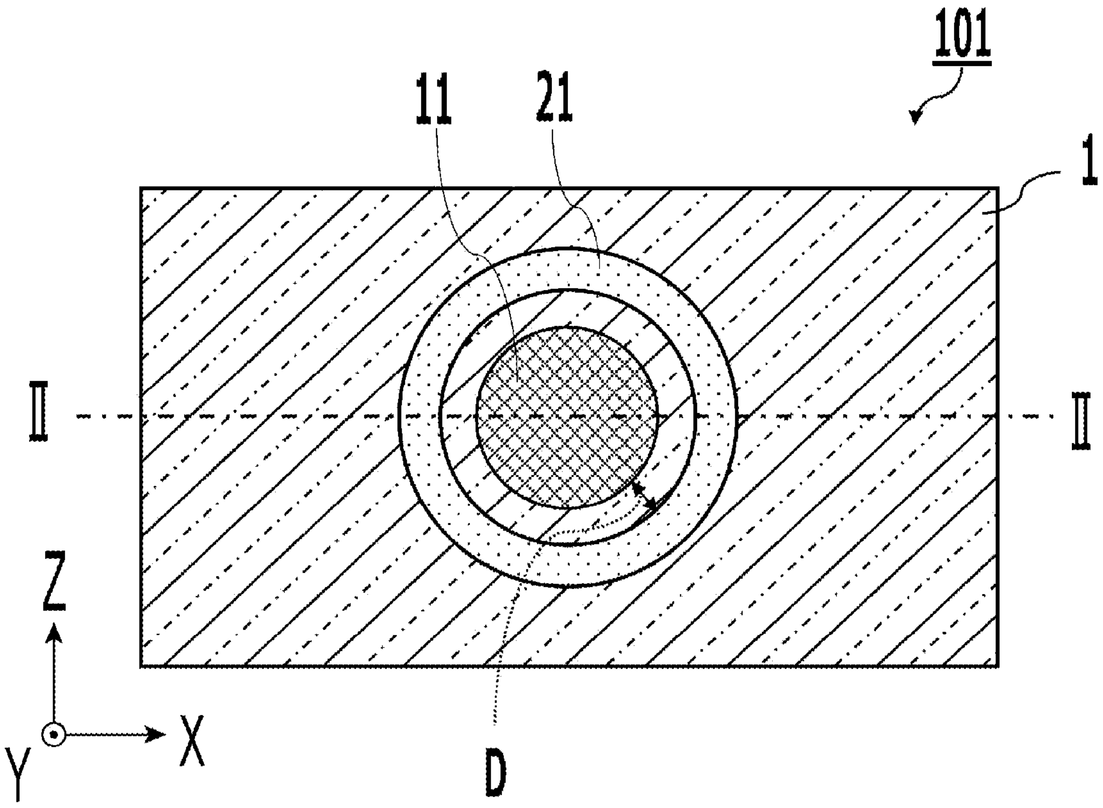
FIG. 2A is a plan view showing an example of the exciter-attached diaphragm according to the first embodiment.
Figure 2B:
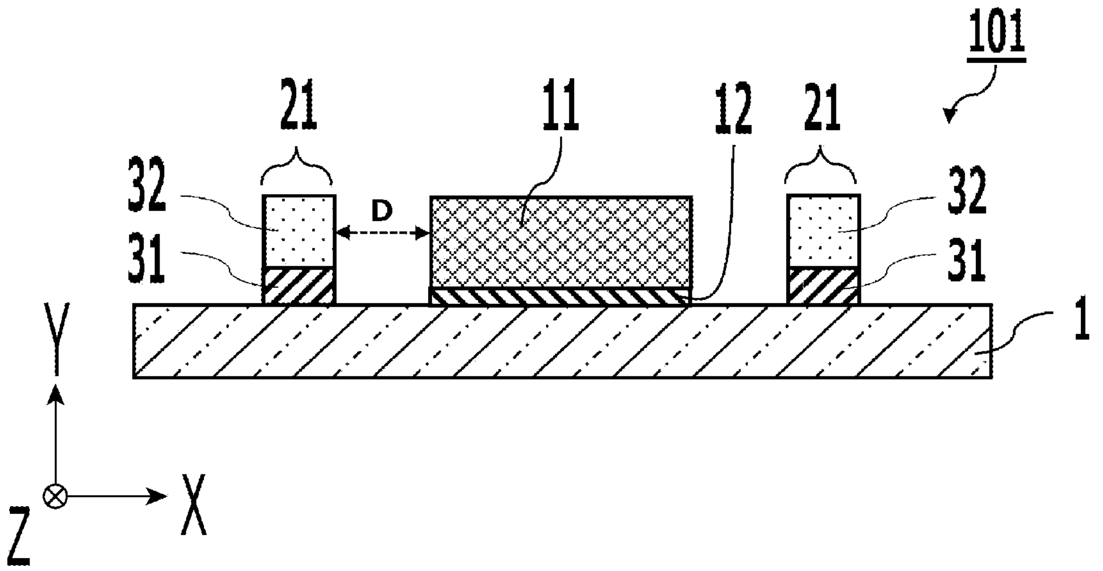
FIG. 2B is a cross-sectional view showing the example of the exciter-attached diaphragm according to the first embodiment.

In FIGS. 2A and 2B, a width of the vibration damping material 32 in a plan view of the glass plate 1 is the same as a width of the vibration attenuation layer 31, and may be different from the width of the vibration attenuation layer 31. For example, the width of the vibration damping material 32 may be larger than the width of the vibration attenuation layer 31, as long as the vibration attenuation layer 31 can firmly fix the glass plate 1 and the vibration damping material 32. Further, as shown in FIG. 2B, a cross section of the vibration damping material 32 has a rectangular shape, and an outer edge of the cross section may have a taper. For example, a cross-sectional shape of the vibration damping material 32 may be a trapezoidal shape whose width gradually increases in a direction away from the main surface of the glass plate 1, or may be any shape other than the trapezoidal shape.

In the plan view of the glass plate 1 (see FIG. 2A), an area of a portion where the exciter 11 is in contact with the glass plate 1, more precisely, an area of the adhesive layer 12, is defined as $S_E$, and an area of a portion where the vibration damping member 21 is in contact with the glass plate 1, more precisely, an area of the vibration attenuation layer 31, is defined as $S_A$. When the $S_E$ is 100%, the $S_A$ may be 80% to 500%, preferably 90% to 400%, and more preferably 100% to 300%. When the $S_A$ is less than 80%, the member may be easily peeled off due to the vibration, and when the $S_A$ is more than 500%, an area occupied by the member is increased, and thus restriction on mounting may be increased.

FIGS. 3A to 3E are plan views showing an exciter-attached diaphragm 102 to an exciter-attached diaphragm 106 according to the present embodiment, respectively, each of which includes the exciter 11 having a circular outer edge. The exciter-attached diaphragm 102 shown in FIG. 3A has a configuration in which a vibration damping member 22, which is an open loop having two cutout portions, surrounds the exciter 11 at a constant distance (D). The vibration damping member 22 is divided into two portions (first vibration damping member 22*a* and second vibration damping member 22*b*) by the two cutout portions. The two cutout portions of the exciter-attached diaphragm 102 both extend in an X-axis direction, and the first vibration damping member 22*a* and the second vibration damping member 22*b* are line symmetrical with respect to an X-axis passing through a center of gravity of the exciter 11. In other words, the vibration damping member 22 is point symmetrical with respect to the center of gravity of the exciter 11. There may be only one cutout portion, and even when there are two cutout portions, the cutout portions may be provided at positions where the first vibration damping member 22*a* and the second vibration damping member 22*b* are non-line-symmetric in a plan view of the glass plate 1.

Figure 3A:
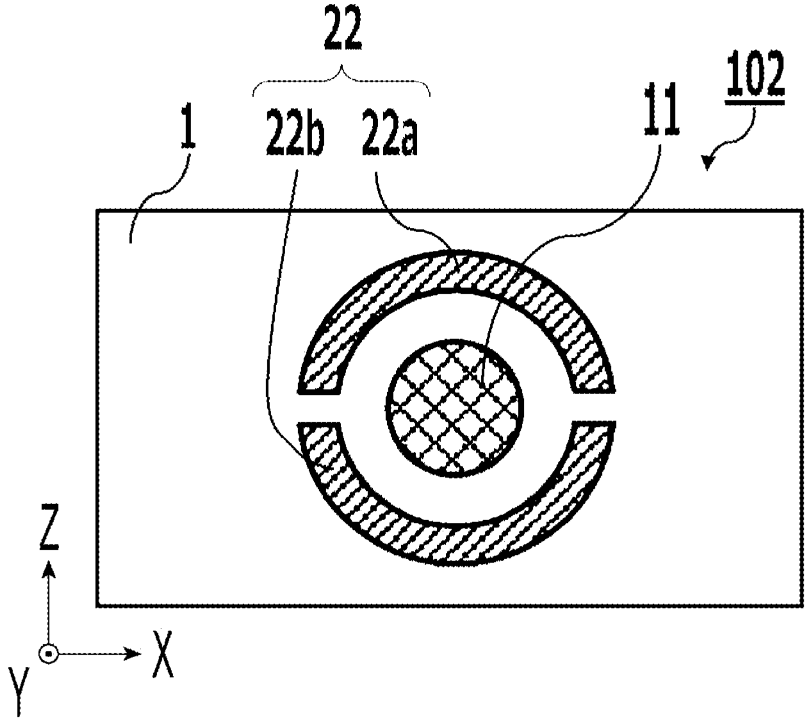
FIG. 3A is a cross-sectional view showing another example of the exciter-attached diaphragm according to the first embodiment.
Figure 3B:
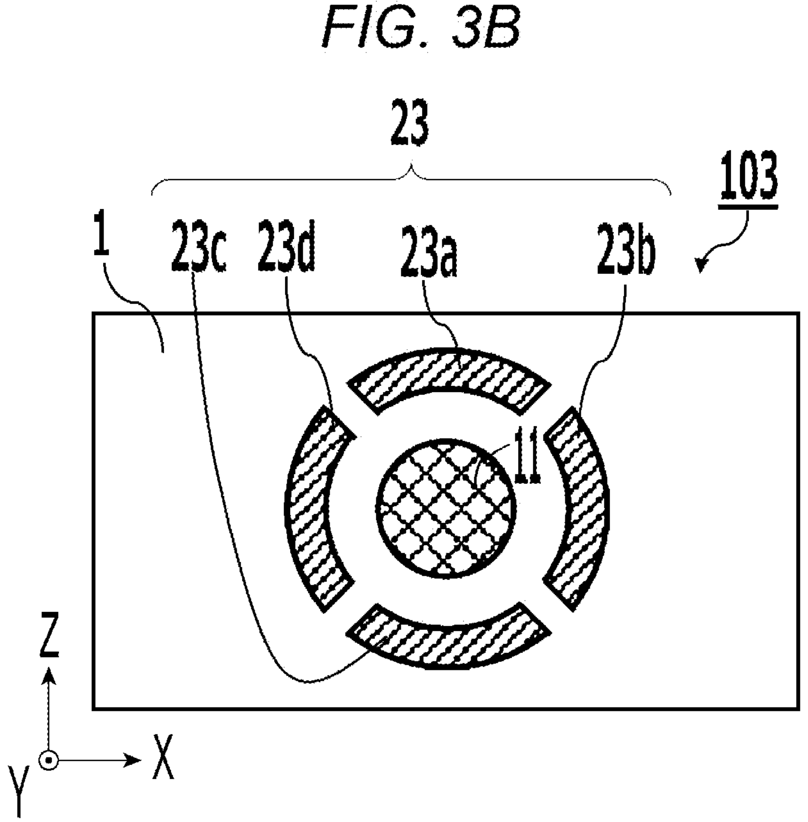
FIG. 3B is a cross-sectional view showing another example of the exciter-attached diaphragm according to the first embodiment.

The exciter-attached diaphragm 103 shown in FIG. 3B has a configuration in which a vibration damping member 23, which is an open loop having four cutout portions, surrounds the exciter 11 at a constant distance (D). The vibration damping member 23 is divided into four portions (first vibration damping member 23*a*, second vibration damping member 23*b*, third vibration damping member 23*c*, and fourth vibration damping member 23*d*) by the four cutout portions. In the four cutout portions of the exciter-attached diaphragm 103, two cutout portions extend in a direction of 45° with respect to an X-axis direction and pass through a center of gravity of the exciter 11, and the remaining two cutout portions extend in a direction of −45° with respect to the X-axis direction and pass through the center of gravity of the exciter 11. The four cutout portions are line symmetrical with respect to an X-axis and a Y-axis. In other words, the vibration damping member 23 is point symmetrical with respect to the center of gravity of the exciter 11. Even when there are four cutout portions, the cutout portions may be provided at positions where the vibration damping member 23 (four portions) is non-line-symmetric in a plan view of the glass plate 1.

Figure 3C:
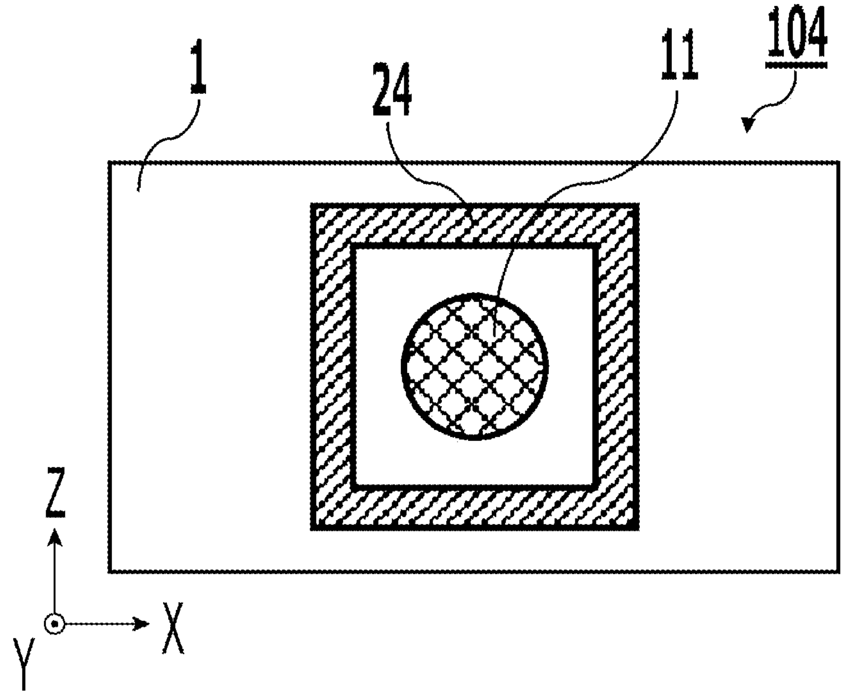
FIG. 3C is a cross-sectional view showing another example of the exciter-attached diaphragm according to the first embodiment.

The exciter-attached diaphragm 104 shown in FIG. 3C is different from the exciter-attached diaphragm 101 shown in FIG. 3A in that a vibration damping member 24 is provided instead of the vibration damping member 21. In a plan view of the glass plate 1, the vibration damping member 24 has a closed loop with an inner edge and an outer edge having a rectangular shape (square shape), and a center of gravity of the vibration damping member 24 coincides with a center of gravity of the exciter 11. The distance D between the exciter 11 and the vibration damping member is not constant, and it is sufficient that the distance D is within the above range.

Figure 3D:
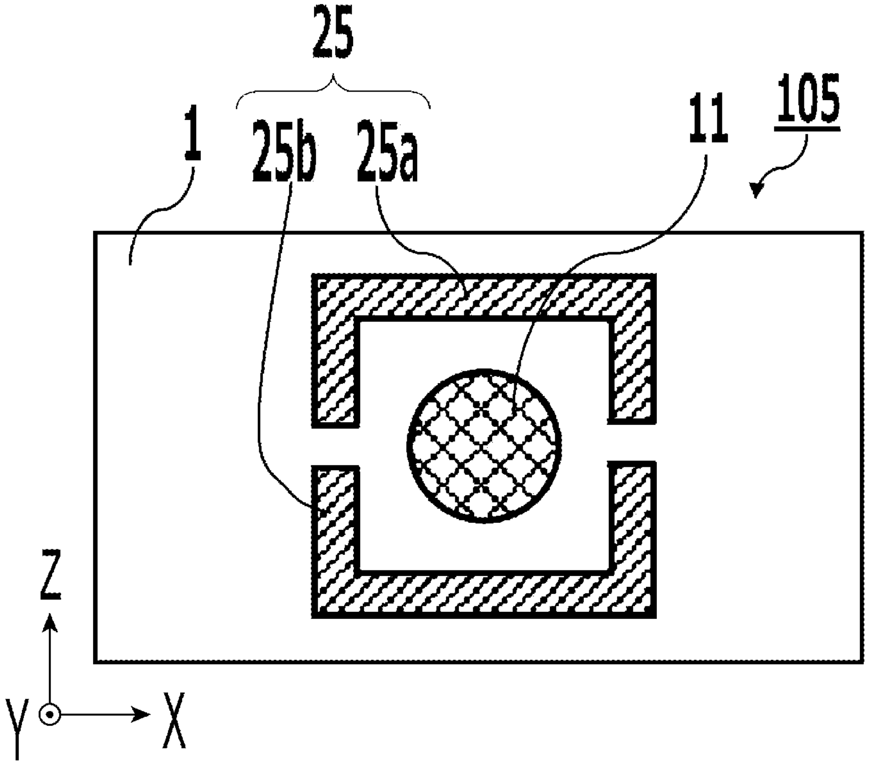
FIG. 3D is a cross-sectional view showing another example of the exciter-attached diaphragm according to the first embodiment.

The exciter-attached diaphragm 105 shown in FIG. 3D has a configuration in which a vibration damping member 25, which is an open loop having two cutout portions, surrounds the exciter 11, as compared with the exciter-attached diaphragm 104 shown in FIG. 3C. The vibration damping member 25 is divided into two portions (first vibration damping member 25*a* and second vibration damping member 25*b*) by the two cutout portions. The two cutout portions of the exciter-attached diaphragm 105 both extend in an X-axis direction, and the first vibration damping member 25*a* and the second vibration damping member 25*b* are line symmetrical with respect to an X-axis passing through a center of gravity of the exciter 11. In other words, the vibration damping member 22 is point symmetrical with respect to the center of gravity of the exciter 11. There may be only one cutout portion, and even when there are two cutout portions, the cutout portions may be provided at positions where the first vibration damping member 25*a* and the second vibration damping member 25*b* are non-line-symmetric in a plan view of the glass plate 1.

Figure 3E:
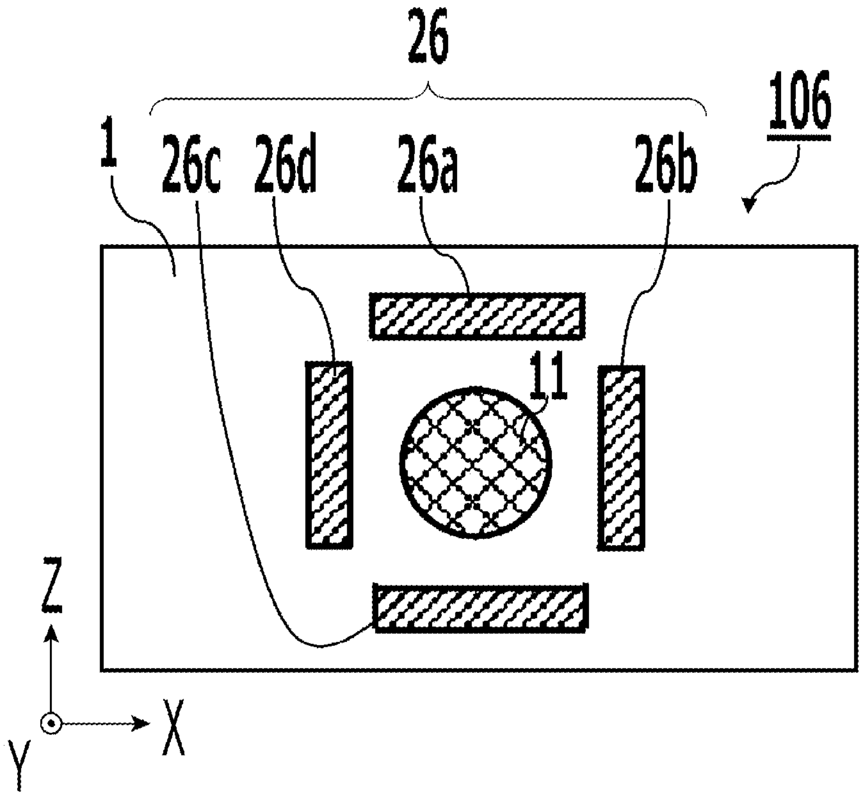
FIG. 3E is a cross-sectional view showing another example of the exciter-attached diaphragm according to the first embodiment.

In the exciter-attached diaphragm 106 shown in FIG. 3E, a vibration damping member 26 has four cutout portions at corners thereof and is divided into four straight (rectangular) portions (first vibration damping member 26*a*, second vibration damping member 26*b*, third vibration damping member 26*c*, and fourth vibration damping member 26*d*), as compared with the exciter-attached diaphragm 104 shown in FIG. 3C. The vibration damping member 26 of the exciter-attached diaphragm 106 is line symmetrical with respect to an X-axis and a Y-axis passing through a center of gravity of the exciter 11. In other words, the vibration damping member 26 is point symmetrical with respect to the center of gravity of the exciter 11. Even when there are four cutout portions, the cutout portions may be provided at positions where the vibration damping member 26 (four portions) is non-line-symmetric in a plan view of the glass plate 1.

As described above, the vibration damping member 21 to the vibration damping member 26 are formed in the closed loop surrounding the exciter 11 or in the open loop having the cutout portions and surrounding at least a part of the exciter 11. In a case where the vibration damping member (vibration damping members 22, 23, 25, and 26) has the open loop, when a circumference length of the vibration damping member in a shape having no cutout portion (for example, the vibration damping member 21 and the vibration damping member 24) is 100%, a (total) length of the vibration damping member excluding the cutout portions may be 50% or more, preferably 80% or more, and more preferably 90% or more. In the plan view of the glass plate 1, the circumference length of the vibration damping member is defined by a length along a center of a width of the vibration damping member.

Figure 4A:
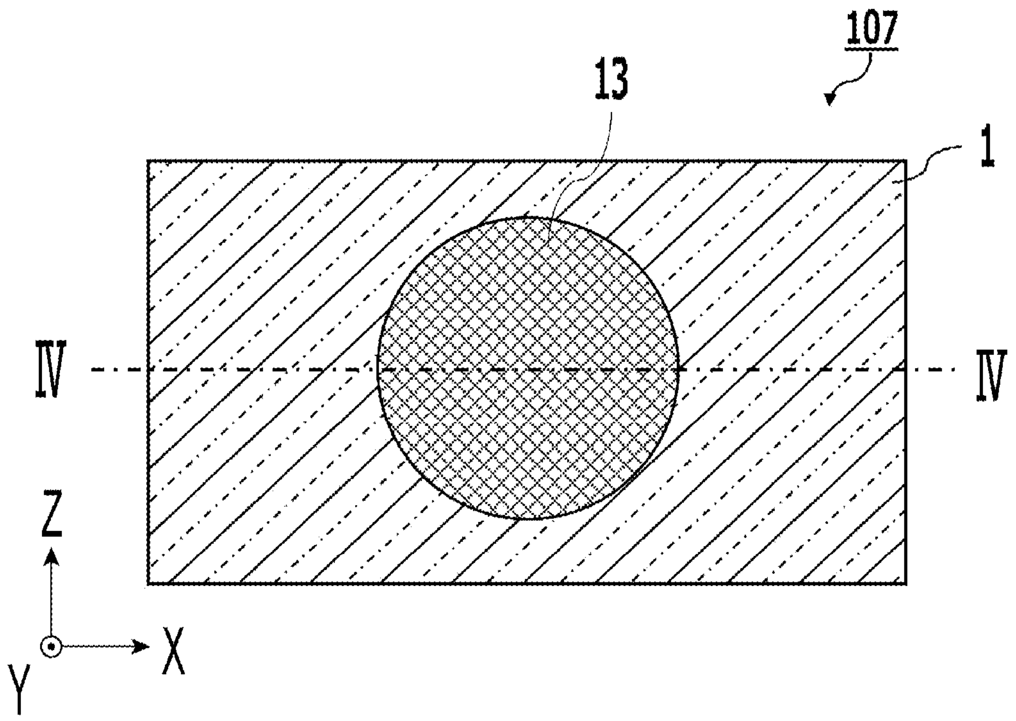
FIG. 4A is a plan view showing another example of the exciter-attached diaphragm according to the first embodiment.
Figure 4B:
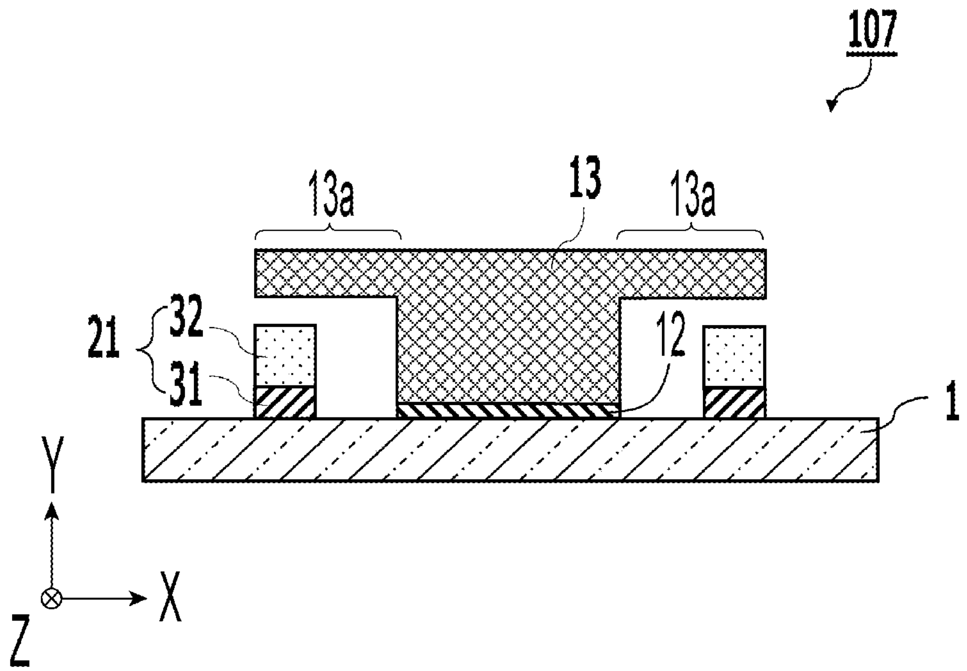
FIG. 4B is a cross-sectional view showing the another example of the exciter-attached diaphragm according to the first embodiment.

Next, another configuration of the exciter-attached diaphragm according to the first embodiment will be described with reference to FIGS. 4A and 4B. FIG. 4B is a cross-sectional view (on an XY plane) of an exciter-attached diaphragm 107 shown in FIG. 4A, taken along a dashed line IV-IV passing through a center of gravity of an exciter 13.

The exciter-attached diaphragm 107 shown in FIG. 4B is different from the exciter-attached diaphragm 101 in that the exciter 13 has a T-shape in a cross-sectional view (side view). In particular, as shown in FIG. 4B, in the exciter-attached diaphragm 107, in a plan view of the glass plate 1, a portion of the exciter 13, which is a flange 13*a*, overlaps all of the vibration damping member 21, and may overlap a part of the vibration damping member 21. As shown in FIG. 4B, there is a distance between the flange 13*a* of the T-shaped exciter 13 and the vibration damping member 21. The distance (gap) in a thickness direction (Y-axis direction) of the glass plate 1 may be 0.2 mm or more, preferably 0.5 mm or more, and more preferably 1.0 mm or more so that the flange 13*a* of the exciter 13 and the vibration damping member 21 do not come into contact with each other due to a vibration of the exciter 13 or the like. There is no particular upper limit for the distance, and the distance is preferably 5.0 mm or less because when the distance is too large, it is difficult to reduce a height due to a portion of the exciter 13 that protrudes from a main surface of the glass plate 1.

Figure 5A:
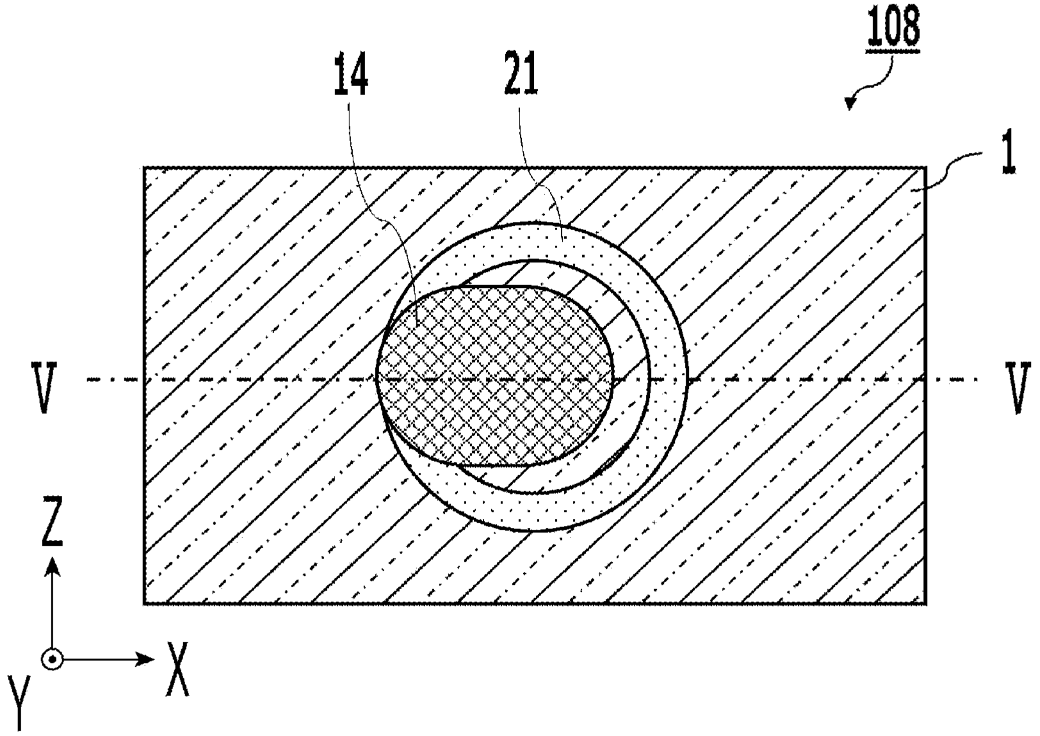
FIG. 5A is a plan view showing another example of the exciter-attached diaphragm according to the first embodiment.
Figure 5B:
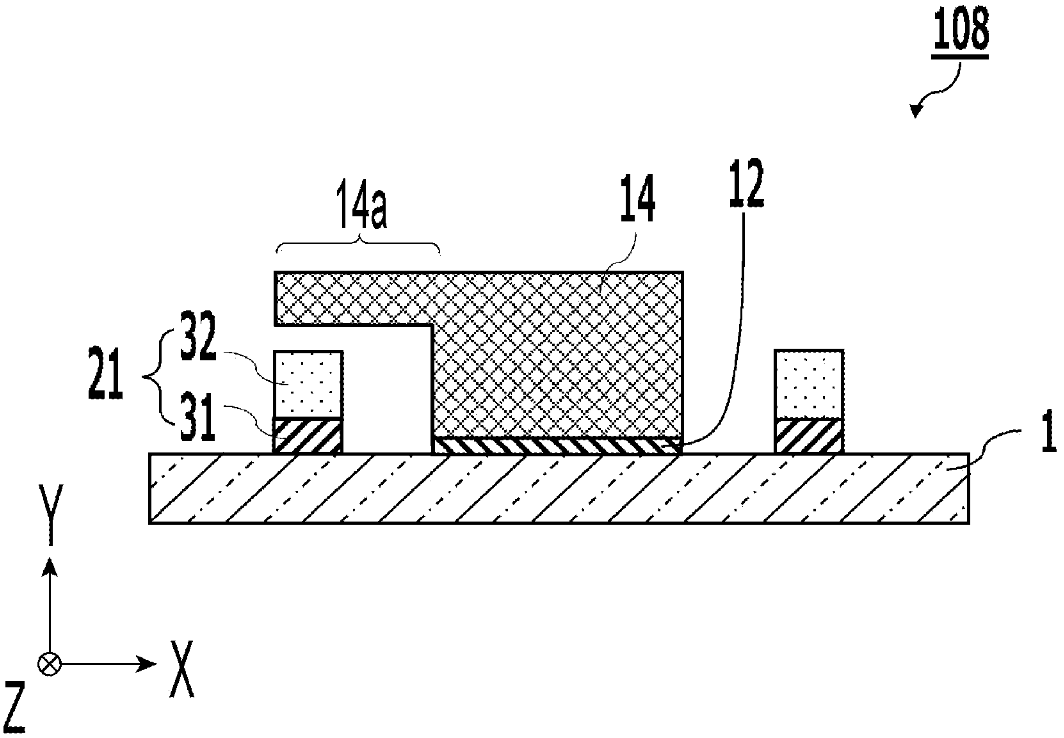
FIG. 5B is a cross-sectional view showing the another example of the exciter-attached diaphragm according to the first embodiment.

Next, another configuration of the exciter-attached diaphragm according to the first embodiment will be described with reference to FIGS. 5A and 5B. FIG. 5B is a cross-sectional view (on an XY plane) of an exciter-attached diaphragm 108 shown in FIG. 5C, taken along a dashed line V-V passing through a center of gravity of an exciter 14.

The exciter-attached diaphragm 108 shown in FIG. 5B is different from the exciter-attached diaphragm 107 in that the exciter 14 has an inverted L-shape in a cross-sectional view (side view). In particular, as shown in FIG. 5A, in the exciter-attached diaphragm 108, in a plan view of the glass plate 1, a portion of the exciter 14, which is an inverted L-shaped flange 14*a*, overlaps a part of the vibration damping member 21. As shown in FIG. 5B, there is a distance between the flange 14*a* of the exciter 14 having an inverted L-shape and the vibration damping member 21. As the distance (gap) in a thickness direction (Y-axis direction) of the glass plate 1, a range between the T-shaped exciter 13 and the flange 13*a* described above can be applied.

Second Embodiment

Figure 6A:
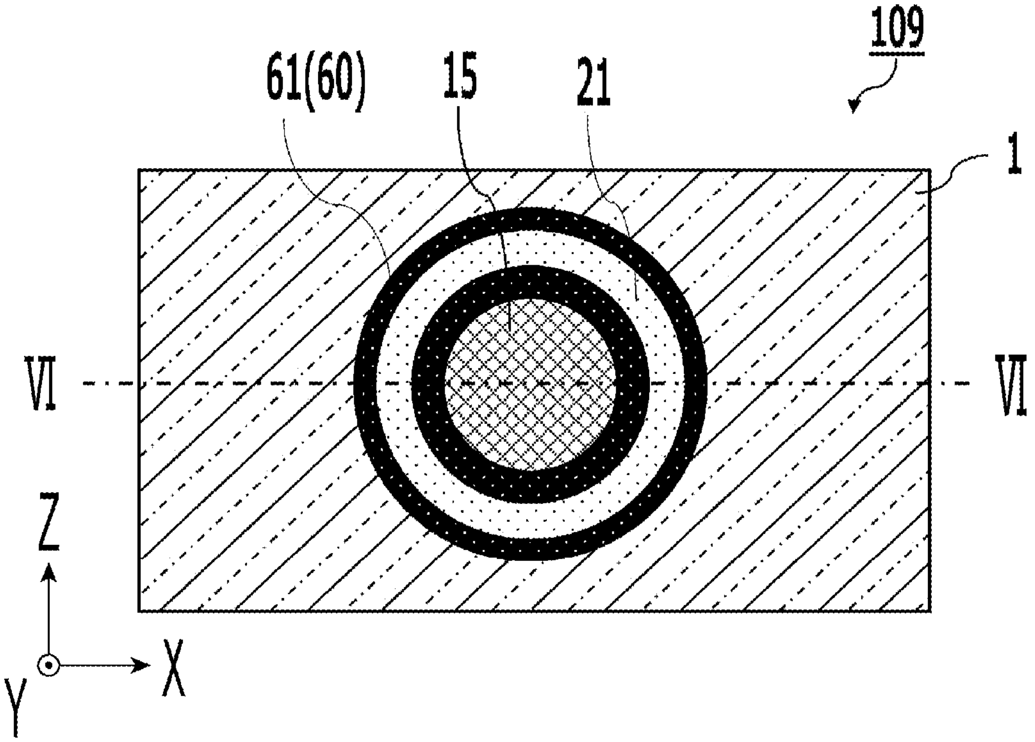
FIG. 6A is a plan view showing an example of an exciter-attached diaphragm according to a second embodiment.
Figure 6B:
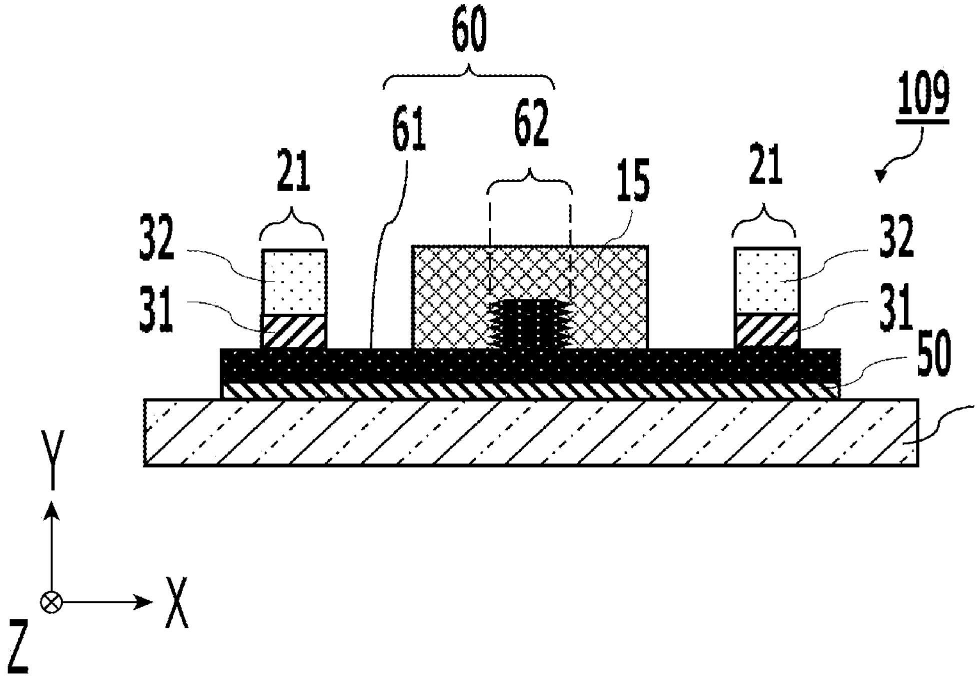
FIG. 6B is a cross-sectional view showing the example of the exciter-attached diaphragm according to the second embodiment.

FIG. 6A is a plan view showing an exciter-attached diaphragm 109 according to a second embodiment, and FIG. 6B is a cross-sectional view (on an XY plane) taken along a dashed line VI-VI passing through a center of gravity of an exciter 15. In the second embodiment, the description of the same configuration, operation, and effect as those of the first embodiment is omitted or simplified by referring to the above description. The exciter-attached diaphragm 109 shown in FIGS. 6A and 6B is different from that of the first embodiment in that an adhesive layer 50 and a mounting member 60 are provided between the glass plate 1, and the vibration damping member 21 and the exciter 15.

As shown in FIG. 6B, the mounting member 60 includes a base portion 61 in contact with the adhesive layer 50 and a (columnar) screw portion 62 protruding from the base portion 61. The vibration damping member 21 is attached to the base portion 61, and the exciter 15 has a concave portion serving as a female screw portion at a center thereof, is engaged with the screw portion 62 corresponding to a male screw portion, and is fastened and fixed to the mounting member 60. The same material as the material of the adhesive layer 12 can be applied to the adhesive layer 50, and thus the description thereof is omitted here. Further, the mounting member 60 is not limited to being fixed by the adhesive layer 50, and may have a structure of being mechanically attached to the glass plate 1. For example, the mounting member 60 may have a structure that can be mechanically fixed by providing a mechanism for engaging or the like by providing irregularities, through holes, or the like on the glass plate 1, or a structure in which the glass plate 1 itself can be mechanically fixed, without performing processing such as cutting, by using a jig (not shown) that connects both main surfaces and end surfaces of the glass plate 1 in a U-shape and sandwiches the glass plate 1.

<Mounting Member>

The mounting member 60 can be formed of one or more materials selected from a metal material such as aluminum or an aluminum alloy and stainless steel, a ceramic, a glass, a resin material, a fiber composite material, and the like. Examples of the resin material include an acrylic resin such as a polymethyl methacrylate (PMMA) resin, polycarbonate (PC), polyvinyl chloride (PVC), urethane, polypropylene (PP), and an ABS resin, and excellent formability can be achieved.

The bonding of the mounting member 60 and the exciter 15 is not limited to a screw structure at one location as shown in FIG. 6B, and screw structures at a plurality of locations or various connection structures can be applied. For example, the mounting member 60 may be constituted by the base portion 61 alone and may be bonded to the exciter 15 with an adhesive, or may be mechanically bonded to the exciter 15 by a plug-in connection such as a screw or a tapered fitting, a caulking connection using a rivet or the like, a connection using a clamp, or the like. When the exciter 15 is mechanically attached to the mounting member 60, the exciter 15 is detachable from the mounting member 60, and the (damaged) exciter 15 can be easily replaced. In the present description, "detachable" means that the exciter 15 can be attached to and removed from the mounting member 60 in a non-destructive manner.

EXAMPLES

Hereinafter, the present invention will be specifically described with reference to Examples, but the present invention is not limited thereto.

Example 1

In Example 1, the exciter-attached diaphragm 101 shown in FIGS. 2A and 2B was produced. Dimensions and the like of the exciter-attached diaphragm 101 are as follows.

Glass plate 1: 300 mm×200 mm×1.1 mm
(length×width×thickness of soda lime glass)
Exciter 11: φ22 mm, height 10 mm
Adhesive layer 12: φ22 mm, thickness 0.5 mm
(3M Company: VHB™ F9460)
Vibration attenuation layer 31: annular shape having an inner diameter of 25 mm, an outer diameter of 45 mm, and a thickness of 0.5 mm
Loss factor η measured at 25° C.: $6\times10^{-1}$
(3M Company: VHB™ F9460)
Vibration damping material 32: annular shape having an inner diameter of 25 mm, an outer diameter of 45 mm, and a thickness of 9 mm
ABS resin (specific gravity: 1.0)
Area $S_E$ of adhesive layer 12 (exciter 11): about 380 $mm^2$
Area $S_A$ of vibration attenuation layer 31 (vibration damping member 21): about 1099 $mm^2$
$(S_A/S_E)\times100$: about 289 [%]

The exciter 11 was attached to a center portion of a main surface of the glass plate 1 via the adhesive layer 12, and the annular-shaped vibration damping member 21 (laminate of the vibration attenuation layer 31 and the vibration damping material 32) was disposed around the exciter. At this time, a center of gravity of the exciter 11 and a center of gravity of the vibration damping member 21 were made to coincide with each other, and the distance D was set to 1.5 mm in a plan view of the glass plate 1.

Figure 7:
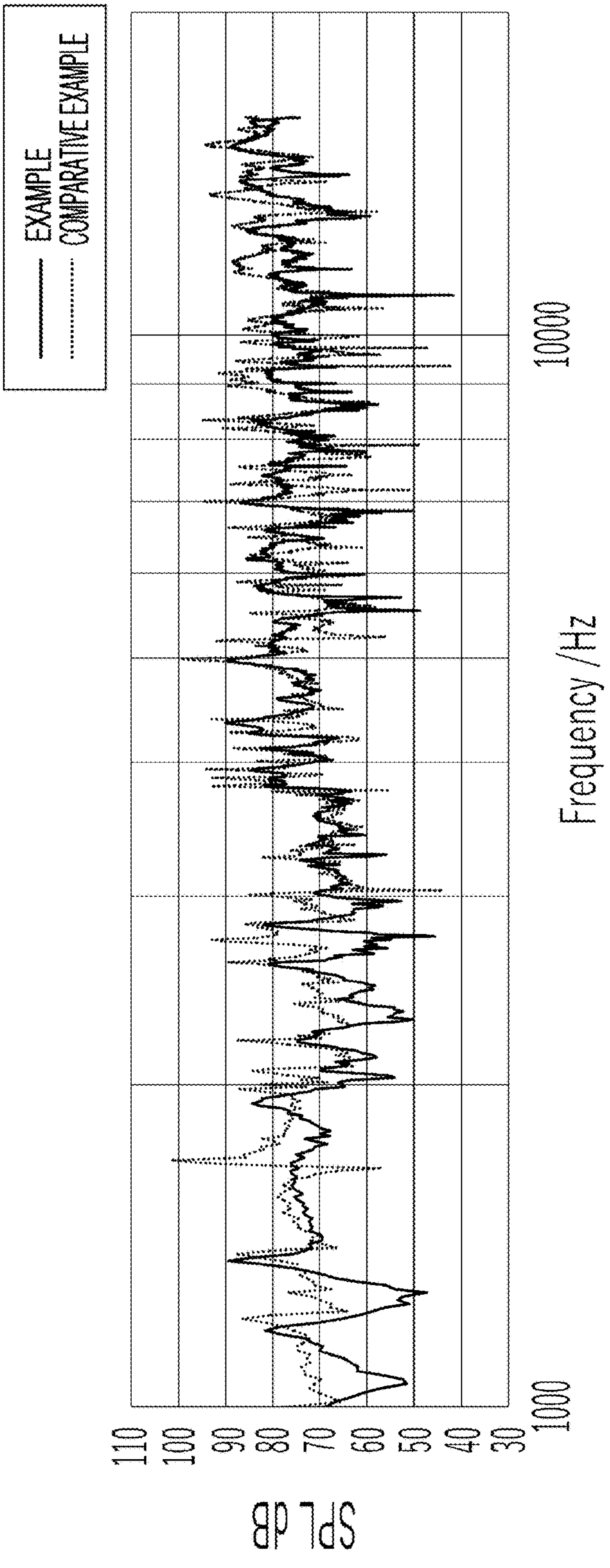
FIG. 7 is a graph showing frequency characteristics of a sound pressure in an exciter-attached diaphragm of each of Example and Comparative Example.

Regarding the exciter-attached diaphragm 101 produced under the above conditions, the exciter 11 was driven in a frequency band of 1 kHz to 16 kHz. At this time, a driving frequency was changed, a sound emitted from the exciter-attached diaphragm 101 was collected using a microphone disposed near a glass, and frequency analysis was performed. FIG. 7 is a graph showing a change in a sound pressure (unit: dB) with respect to the driving frequency at this time, and a solid line in FIG. 7 indicates sound pressure characteristics of Example 1.

Comparative Example 1

In Comparative Example 1, an exciter-attached diaphragm was produced by removing the vibration damping member 21 alone (laminate of the vibration attenuation layer 31 and the vibration damping material 32) from the exciter-attached diaphragm 101 of Example 1. Also in Comparative Example 1, a change in a sound pressure with respect to the driving frequency was analyzed under the same conditions as the above conditions for the produced exciter-attached diaphragm. A broken line in FIG. 7 indicates sound pressure characteristics of Comparative Example 1.

As shown in the graph of FIG. 7, it was confirmed that in the entire driving frequency band of 1 kHz to 16 kHz, a sound pressure fluctuation was smaller in Example 1 including the vibration damping member 21 than in Comparative Example 1. In particular, among the above frequency band, in a high driving frequency band of 5 kHz or more, the prevention of the sound pressure fluctuation in Example 1 was remarkably exhibited. Accordingly, in Example 1 including the vibration damping member 21, a sound quality was improved, and a remarkable improvement effect was confirmed particularly in a high frequency band as compared with Comparative Example 1.

Note that the present application is based on Japanese Patent Application No. 2021-190406 filed on Nov. 24, 2021, contents of which are incorporated herein by reference.

REFERENCE SIGNS LIST

- 1: glass plate
- 11, 13, 14 and 15: exciter
- 13*a* and 14*a*: flange
- 12 and 50: adhesive layer
- 21, 22, 23, 24, 25 and 26: vibration damping member
- 31: vibration attenuation layer
- 32: vibration damping material
- 60: mounting member
- 61: base portion
- 62: screw portion
- 100, 101, 102, 103, 104, 105, 106, 107, 108 and 109: exciter-attached diaphragm

What is claimed is:

1. An exciter-attached diaphragm, comprising:

a glass plate;

an exciter attached on a main surface side of the glass plate and configured to vibrate the glass plate; and a vibration damping member located on a periphery of the exciter, surrounding at least a part of the exciter, and attached on the main surface side in a plan view of the glass plate, wherein the vibration damping member comprises a vibration attenuation layer and a vibration damping material laminated from the main surface side of the glass plate, the exciter is disposed apart from the vibration damping member, and the exciter has a T-shaped cross section or an inverted L-shaped cross section, and in the plan view of the glass plate, a part of the exciter and at least a part of the vibration damping member are disposed so as to overlap each other with a gap therebetween.

2. The exciter-attached diaphragm according to claim 1, wherein the vibration damping member is disposed so as to surround 50% or more of the periphery of the exciter in the plan view of the glass plate.

3. The exciter-attached diaphragm according to claim 1, wherein the vibration damping member is disposed so as to entirely surround the periphery of the exciter in the plan view of the glass plate.

4. The exciter-attached diaphragm according to claim 1, wherein the vibration damping member extends with a substantially constant width in the plan view of the glass plate.

5. The exciter-attached diaphragm according to claim 1, wherein the vibration damping member is point symmetrical with respect to a center of gravity of the exciter in the plan view of the glass plate.

6. The exciter-attached diaphragm according to claim 5, wherein the vibration damping member has an annular shape in the plan view of the glass plate.

7. The exciter-attached diaphragm according to claim 1, wherein the exciter is fixed to the glass plate via an adhesive layer.

8. The exciter-attached diaphragm according to claim 7, wherein an area of the adhesive layer is $S_E$ and an area of the vibration attenuation layer is $S_A$, and $S_A$ is 80% to 500% when $S_E$ is 100% in the plan view of the glass plate.

9. The exciter-attached diaphragm according to claim 1, wherein the exciter is mechanically fixed via a mounting member attached to a main surface of the glass plate.

10. The exciter-attached diaphragm according to claim 9, wherein the mounting member is disposed between the glass plate, and the exciter and the vibration damping member.

11. The exciter-attached diaphragm according to claim 1, wherein a height of the vibration damping member is same as or lower than a height of the exciter when a main surface of the glass plate is used as a reference.

12. The exciter-attached diaphragm according to claim 1, wherein a distance D between the exciter and the vibration damping member is 0.2 mm to 50 mm.

13. The exciter-attached diaphragm according to claim 1, wherein the vibration damping material has a specific gravity of 1.0 or more.

14. The exciter-attached diaphragm according to claim 1, wherein the vibration damping material comprises at least one material selected from a resin, a glass, a metal, and a ceramic.

15. The exciter-attached diaphragm according to claim 1, wherein the vibration attenuation layer comprises a material having a loss factor of $1.0\times10^{-2}$ or more measured at 25° C.

16. The exciter-attached diaphragm according to claim 1, wherein the glass plate is a single plate glass.

17. The exciter-attached diaphragm according to claim 1, wherein the glass plate is a tempered glass.

18. The exciter-attached diaphragm according to claim 1, wherein the glass plate is a bent glass having a predetermined curvature.

19. A vehicular window glass, comprising:

the exciter-attached diaphragm according to claim 1 as a window member.

20. An exciter-attached diaphragm, comprising:

a glass plate;

an exciter attached on a main surface side of the glass plate and configured to vibrate the glass plate; and a vibration damping member located on a periphery of the exciter, surrounding at least a part of the exciter, and attached on the main surface side in a plan view of the glass plate, wherein the vibration damping member comprises a vibration attenuation layer and a vibration damping material laminated from the main surface side of the glass plate, the exciter is disposed apart from the vibration damping member, the exciter is mechanically fixed via a mounting member attached to a main surface of the glass plate, and the mounting member is disposed between the glass plate, and the exciter and the vibration damping member.

* * * * *